US012723461B2

(12) United States Patent
Yi et al.

(10) Patent No.: US 12,723,461 B2
(45) Date of Patent: Sep. 1, 2026

(54) GUN CONTAINER HAVING DOUBLE-COUPLING LOCKING MECHANISM

(71) Applicant: JIANGXI FINGERCHIP INTELLIGENT TECHNOLOGY CO., LTD., Yichun (CN)

(72) Inventors: Haiping Yi, Yichun (CN); Jun Yu, Yichun (CN); Minghua Xiong, Yichun (CN)

(73) Assignee: JIANGXI FINGERCHIP INTELLIGENT TECHNOLOGY CO., LTD., Yichun (CN)

( * ) Notice: Subject to any disclaimer, the term of this patent is extended or adjusted under 35 U.S.C. 154(b) by 78 days.

(21) Appl. No.: 18/967,623

(22) Filed: Dec. 3, 2024

(65) Prior Publication Data

US 2026/0071478 A1 Mar. 12, 2026

(30) Foreign Application Priority Data

Sep. 11, 2024 (CN) ......................... 202411268979.0

(51) Int. Cl.
*E05G 1/00* (2006.01)

(52) U.S. Cl.
CPC .................................... *E05G 1/005* (2013.01)

(58) Field of Classification Search
CPC ...................................................... E05G 1/005
See application file for complete search history.

(56) References Cited

U.S. PATENT DOCUMENTS

| | | | | |
|---|---|---|---|---|
| 5,111,755 A * | 5/1992 | Rouse | E05G 1/00 | 109/47 |
| 5,172,575 A * | 12/1992 | Fisher | E05B 65/0014 | 70/289 |
| 5,881,584 A * | 3/1999 | Brunoski | E05B 47/0012 | 292/144 |
| 6,260,300 B1 * | 7/2001 | Klebes | F41A 17/066 | 42/70.11 |
| 6,279,359 B1 * | 8/2001 | Boisvert | E05G 1/005 | 109/51 |
| 6,318,134 B1 * | 11/2001 | Mossberg | E05B 65/5292 | 292/144 |

(Continued)

FOREIGN PATENT DOCUMENTS

| | | |
|---|---|---|
| CN | 204139784 U | 2/2015 |
| CN | 213330492 U | 6/2021 |

*Primary Examiner* — Mark A Williams

(57) ABSTRACT

A gun container having a double-coupling locking mechanism includes a box body and a cover covering an opening of the box body. A mounting base is arranged in the box body and defines a mounting cavity; a movable shaft is received in the mounting cavity. A locking tongue is arranged at an end of the movable shaft; a reciprocately-driving module is controlled by an electric password switch module and is arranged to drive the movable shaft to move reciprocately; a locking core is perpendicular to the movable shaft and located at a front side of the movable shaft; the mounting base defines a slot in which a locking latch is inserted; the locking tongue is mated with the locking latch to lock the cover; the movable shaft or the locking tongue is fixedly arranged with an extension shaft, extending towards the locking core.

10 Claims, 7 Drawing Sheets

(56) References Cited

U.S. PATENT DOCUMENTS

| | | | | |
|---|---|---|---|---|
| 6,843,081 | B1 * | 1/2005 | Painter | F41C 33/06 42/70.11 |
| 11,554,722 | B1 * | 1/2023 | Mothersele | F41C 33/06 |
| 12,435,560 | B1 * | 10/2025 | Zhuang | G07C 9/00563 |
| 2016/0195366 | A1 * | 7/2016 | Kowalczyk | F41C 27/00 292/194 |
| 2019/0211607 | A1 * | 7/2019 | Delattre | G07C 9/00912 |
| 2023/0212881 | A1 * | 7/2023 | Wang | E05B 65/52 70/277 |

* cited by examiner

GUN CONTAINER HAVING DOUBLE-COUPLING LOCKING MECHANISM

TECHNICAL FIELD

Embodiments of the present disclosure relate to a technical field of gun containers, and more specifically, to a gun container having a double-coupling locking mechanism.

BACKGROUND

Currently various countries in the world do not have mandatory regulation for guns and allow citizens to own guns. In order to prevent children and thieves from accessing the guns, a gun container is made as a security product for the citizens of the various countries. Therefore, technicians have developed a gun container or a safe box having a switch controlled by an electric password lock. However, the safe box has some defects, and that is, when an electric password lock module of a control system malfunctions, a locking mechanism of the safe box cannot be opened. In emergency situations, unnecessary troubles may be caused, and therefore, the safe box in the art needs to be improved.

SUMMARY

The present disclosure provides a gun container having a double-coupling locking mechanism to solve the technical problem in the above.

In an aspect, the present disclosure provides a gun container having a double-coupling locking mechanism, including a box body and a cover covering an opening at a top of the box body. A mounting base is fixedly arranged in the box body, the mounting base defines a mounting cavity; a movable shaft is received in the mounting cavity and is extended horizontally; a locking tongue is arranged at an end of the movable shaft; a reciprocately-driving module is received in the mounting cavity and is configured to drive the movable shaft to move reciprocately along an axial length direction of the movable shaft; an electric password switch module is arranged on the box body and is configured to control the reciprocately-driving module; a locking core is arranged on the box body and is perpendicular to the movable shaft and located at a front side of the movable shaft; the cover is arranged with a locking latch; the mounting base defines a slot in which the locking latch is inserted; a front end of the locking tongue extends into the slot to be mated with the locking latch to lock the cover; the movable shaft or the locking tongue is fixedly arranged with an extension shaft, extending towards the locking core; the locking core is arranged with a pendulum arm that is configured to drive the extension shaft to move; an inner wall of the mounting cavity defines a movement hole in which the extension shaft is capable of moving.

In some embodiments, the reciprocately-driving module includes a slide sleeve that coaxially and slidably sleeves the movable shaft, a connection rod configured to drive the slide sleeve to move, a gear rod configured to drive the connection rod to move along a length direction of the movable shaft, and a motor configured to drive the gear rod to move reciprocately; the movable shaft is sleeved by two springs, and the two springs are respectively disposed on two sides of the slide sleeve; an end of each of the two springs away from the slide sleeve is positioned on the movable shaft by a limiting member.

In some embodiments, the movable shaft is disposed between the motor and the slot and is extending perpendicularly to an axis of the motor; a first positioning seat is received in the mounting cavity and is disposed on a side of the motor facing towards the movable shaft; the first positioning seat defines a travel groove in which the movable shaft is capable of moving; and when assembled in place, gears on a rotation shaft of the motor abuts the gear rod against a top surface of the mounting cavity.

In some embodiments, an end of the movable shaft away from the locking tongue is arranged with an annular tab; the limiting member for one of the two springs is the annular tab, the limiting member for the other one of the two springs is the locking tongue; and when assembled in place, the annular tab is received in the travel groove.

In some embodiments, a second positioning seat is received in the mounting cavity and is disposed on a side of the motor away from the first positioning seat the travel groove extends through a lower end of the first positioning seat, and the first positioning seat is connected to a lower end of the second positioning seat through a fixation plate; a positioning cavity is formed cooperatively by the first positioning seat, the second positioning seat, and the fixation plate; and the motor is positioned in the positioning cavity; and when assembled in place, the fixation plate limits the annular tab in the travel groove.

In some embodiments, the extension shaft is arranged on the locking tongue, the movement hole is in an elongated shaped and extends along a length direction of the movable shaft; an end of the movement hole away from the locking tongue is communicated with a vertical hole extending downwardly, and the extension shaft is configured be inserted in the vertical hole.

In some embodiments, a third positioning seat is received in the mounting cavity and corresponds to the locking tongue; the third positioning seat defines a through hole, and a front end of the locking tongue is configured to extend through the through hole; in a locked state, the extension shaft abuts against a side wall of the third positioning seat facing towards the motor; the slot is disposed on a side of the third positioning seat away from the motor.

In some embodiments, a mounting plate extending vertically is arranged inside the box body and at a front end of the box body; a left end and a right end of the mounting plate are both fixedly connected to the box body; the locking core is disposed at a front side of the mounting plate; an upper end of the mounting plate is arranged with a first extension portion that extends frontwardly; the mounting seat is fixed to a lower surface of the first extension portion; the electric password switch module is arranged at a front side of an upper surface of the first extension portion; a rear side of the upper surface of the first extension portion is arranged with a fastening position corresponding to the cover; the fastening position defines an avoidance hole corresponding to the slot, the locking latch extends through the avoidance hole.

In some embodiments, the box body includes a bottom plate; each of a front end and a rear end of the bottom plate is arranged with a vertical portion that is extending vertically and upwardly; the box body further includes two side plates respectively covering an opening at a left of the bottom plate and an opening at a right of the bottom plate; an upper end of the vertical portion at the front end of the bottom plate is arranged with a second extension portion extending rearwardly; the electric password switch module is disposed between the second extension portion and the first extension portion; the second extension portion is arranged with an operation window through which an operation is capable of being performed on the electric password switch module.

In some embodiments, the cover is rotatably arranged, via a rotation shaft, on the vertical portion at the rear end of the bottom plate; the vertical portion at the front end of the bottom plate defines a mounting hole corresponding to the locking core.

According to the present disclosure, under normal situations, a user takes the electric password switch module to control the reciprocating drive mechanism to drive the movable shaft to move towards front or rear in the axial direction. The locking tongue is fastened into or taken out of the hole in the locking latch. In this way, the box body can be opened or closed without any key. When the electric password switch module fails due to malfunctioning and the box body needs to be opened, the key is inserted into the locking core and is rotated, enabling the locking core to drive the pendulum arm to rotate and to drive the extension shaft to move towards the rear side. In this way, the movable shaft and the locking tongue are driven to move out of the locking latch. The box body can be opened by mechanical means, and even if an electronic system fails, the box body can be opened normally by the key, and the box body can be used conveniently.

BRIEF DESCRIPTION OF THE DRAWINGS

In order to more clearly illustrate technical solutions in embodiments or the related art of the present disclosure, accompanying drawings for describing the embodiments or the related art will be briefly introduced below. Obviously, the accompanying drawings in the following description are some of the embodiments of the present disclosure, and any ordinary skilled person in the art may obtain other drawings based on the accompanying drawings without any creative work.

DETAILED DESCRIPTIONS

Terms "first", "second", "third" and "fourth" in the specification, claims, and the drawings of the present disclosure are used to distinguish between different objects and do not describe a particular order. In addition, terms "comprises", "have", and any variations thereof, are intended to cover non-exclusive inclusion. For example, a process, a method, a system, a product or an apparatus comprising a series of steps or units is not limited to the listed steps or units, but may further include steps or units that are not listed or are inherently included in the process, the method, the system, the product or the apparatus.

Reference to "embodiment" herein indicates that particular features, structures, or characteristics described an embodiment may be included in at least one embodiment of the present disclosure. The term at various sections in the specification does not necessarily refer to one embodiment, nor a separate or alternative embodiment that is mutually exclusive of other embodiments. Any ordinary skilled person in the art shall understand both explicitly and implicitly that the embodiments described herein may be combined with other embodiments.

The term "a plurality of" means two or more, and the term "and/or" describes an association relationship of associated objects and indicates that three relationships exist. For example, A and/or B indicates three cases: A being present alone, both A and B being present, and B being present alone. The character "/" indicates an object before the character "or" an object after the character.

Terms "up", "down", "left", "right", "upper", "lower", "vertical" and so on, indicate orientations and shall be interpreted based on an attitude or a position of a device or an apparatus during normal use.

In order to make objectives, technical solutions and characteristics of the embodiments of the present disclosure clearer, the technical solutions in the embodiments of the present disclosure will be described clearly and completely by referring to embodiments. Obviously, the described embodiments are some of, not all of, the embodiments of the present disclosure. All other embodiments, which are obtained by any ordinary skilled person in the art based on the embodiments of the present disclosure without creative work, shall fall within the scope of the present disclosure.

Figure 1:
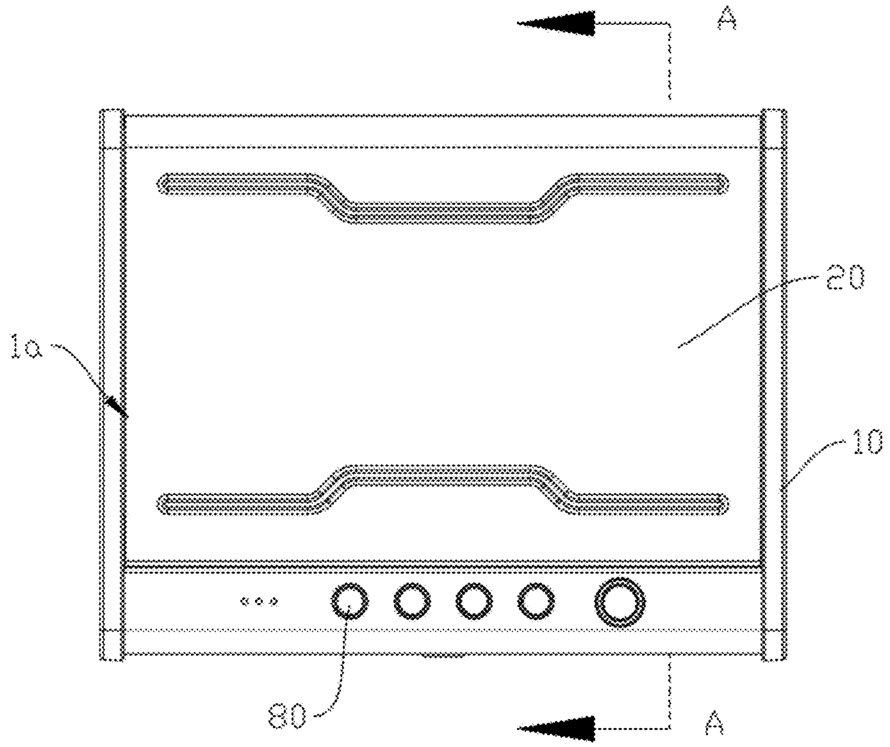
FIG. 1 is a top view of an overall of a gun container according to some embodiments of the present disclosure.
Figure 2:
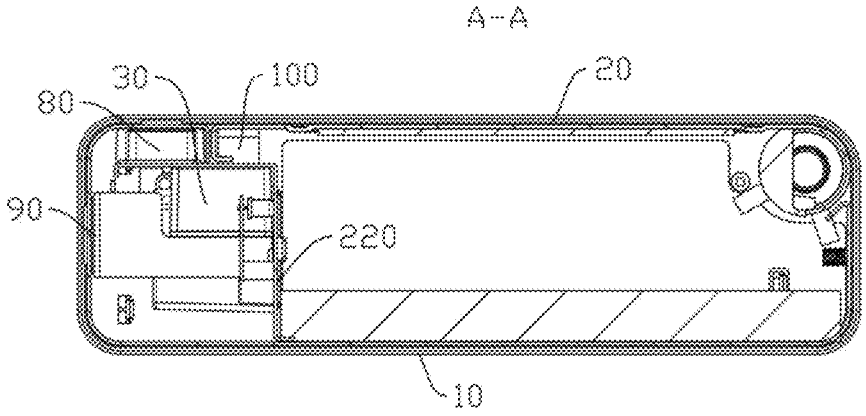
FIG. 2 is a cross-sectional view of the gun container shown in FIG. 1, taken along a line A-A.
Figure 3:
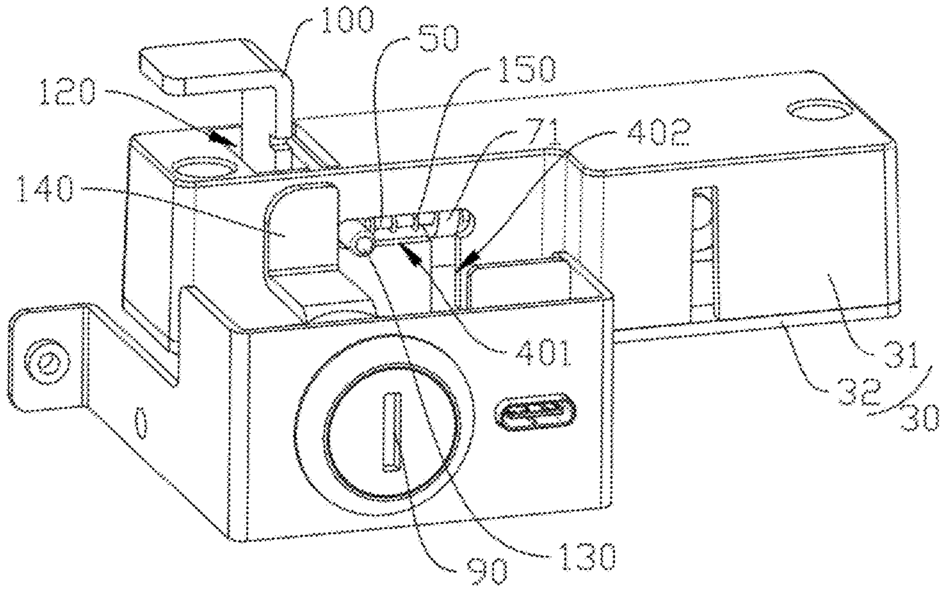
FIG. 3 is a perspective of an overall of a mounting base according to some embodiments of the present disclosure.
Figure 4:
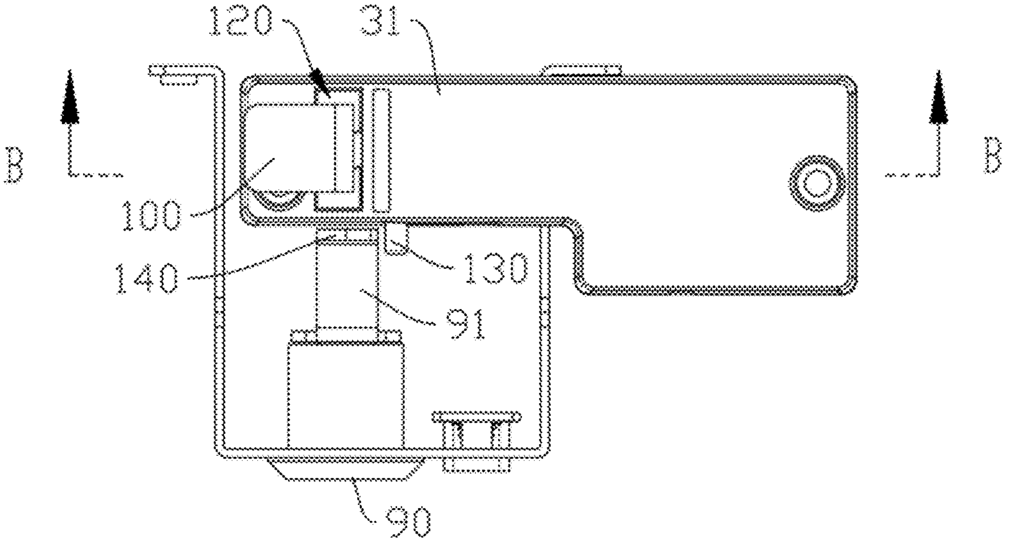
FIG. 4 is a top view of the mounting base shown in FIG. 3.
Figure 5:
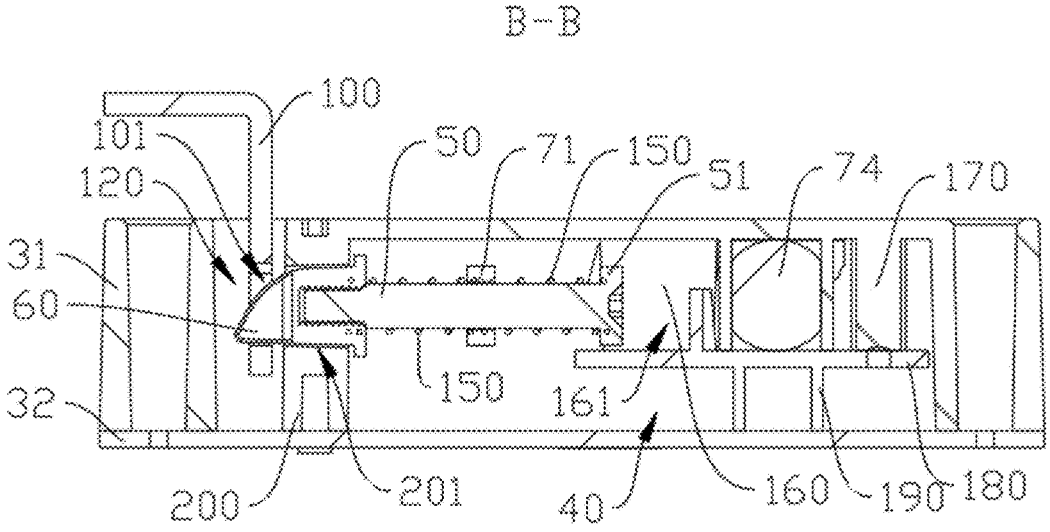
FIG. 5 is a cross-sectional view of the mounting base shown in FIG. 4, taken along a line B-B.
Figure 6:
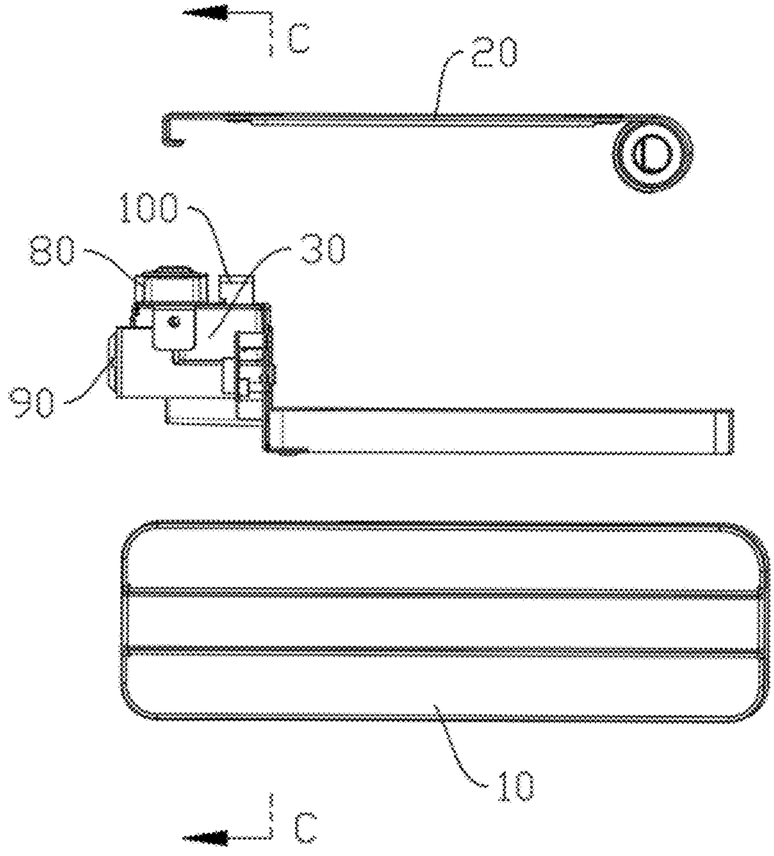
FIG. 6 is an exploded view of the gun container along a vertical direction according to some embodiments of the present disclosure.
Figure 7:
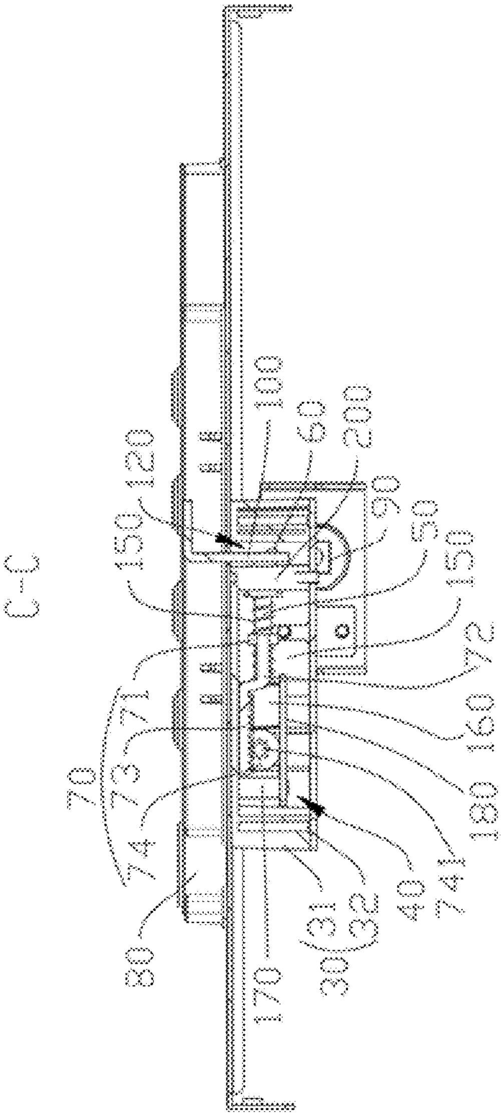
FIG. 7 is a cross-sectional view of the gun container shown in FIG. 6, taken along a line C-C at the mounting base.
Figure 8:
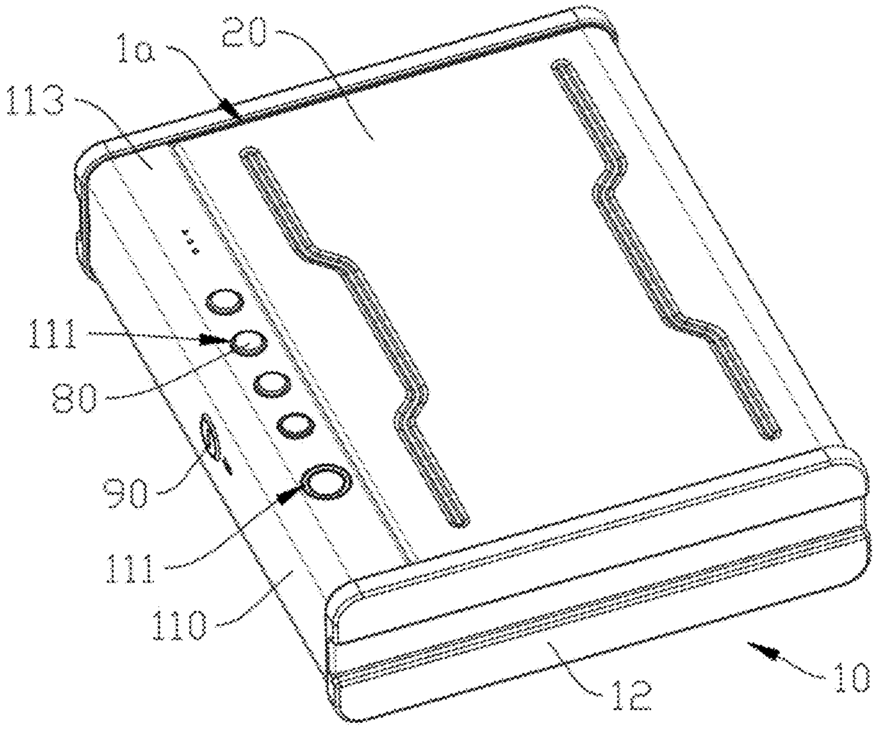
FIG. 8 is a perspective view of the overall of the gun container according to some embodiments of the present disclosure.
Figure 9:
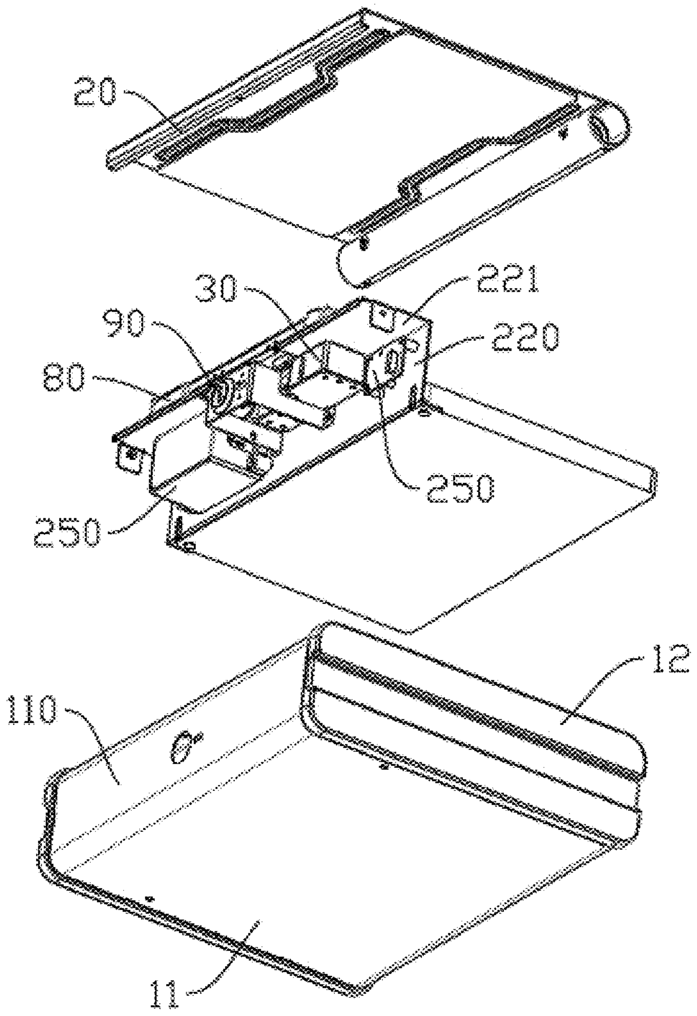
FIG. 9 is an exploded view of the gun container along the vertical direction, being viewed from a bottom side, according to some embodiments of the present disclosure.
Figure 10:
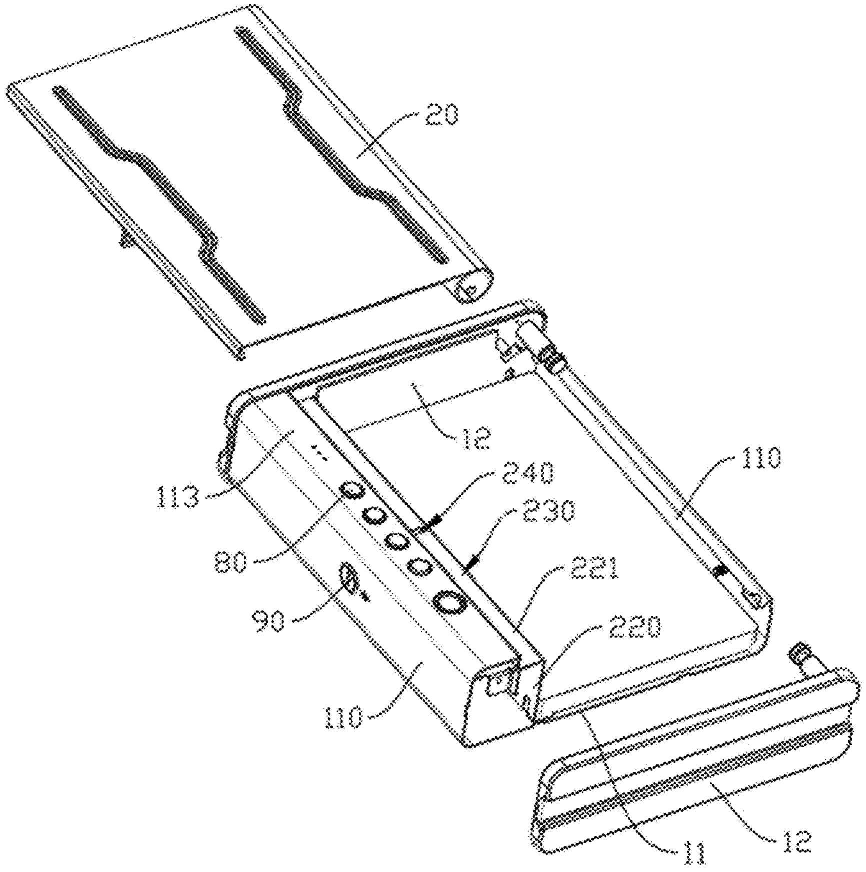
FIG. 10 is an exploded view of the gun container along a left-right direction, being viewed from a perspective viewing angle, according to some embodiments of the present disclosure.
Figure 11:
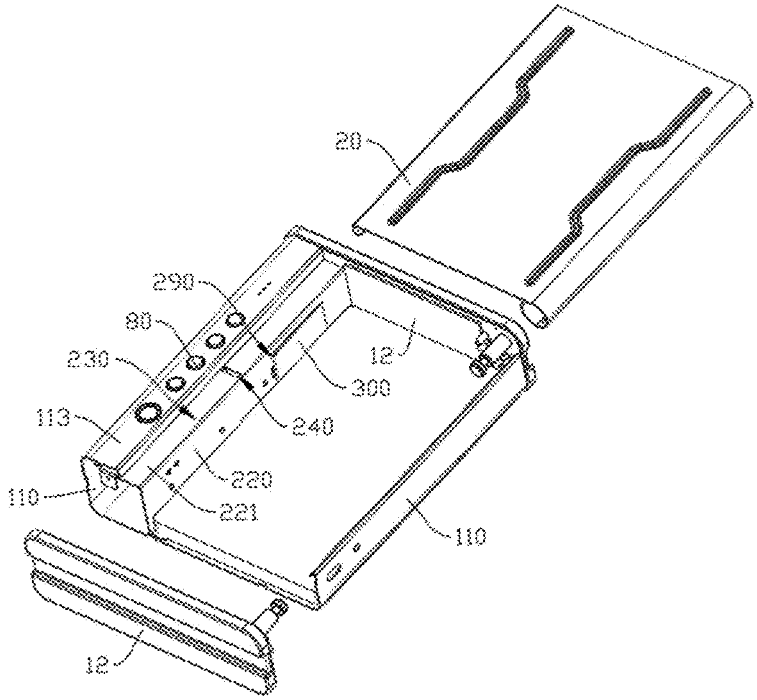
FIG. 11 is the exploded view of the gun container shown in FIG. 10, being viewed from another perspective viewing angle.

In the present embodiment, as shown in FIGS. 1 to 11, a gun container having a double-coupling locking mechanism is provided and includes a box body 10 and a cover 20 covering an opening 1*a* at a top of the box body 10. A mounting base 30 is fixedly arranged in the box body 10. In detail, the mounting base 30 is rectangular and is provided along a left-right direction. Furthermore, the mounting base 30 defines a mounting cavity 40. A movable shaft 50 is received in the mounting cavity 40 and is extended horizontally and along the left-right direction. A locking tongue 60 is arranged at an end of the movable shaft 50. Further, a reciprocately-driving module 70 is received in the mounting cavity 40 to drive the movable shaft 50 to move reciprocately frontwardly and rearwardly along an axial length direction of the movable shaft 50. An electric password switch module 80 is arranged on the box body 10 to control the reciprocately-driving module 70. A locking core 90 is arranged on the box body 10 and is perpendicular to the movable shaft 50 and located at a front of the movable shaft 50. In detail, the locking core 90 is arranged on a front side wall of the box body 10, i.e., on a side of the movable shaft 50. A user can manually input a password through the electric password switch module to activate the reciprocately-driving module 70 to control the movable shaft 50 and the locking tongue 60 to move. Furthermore, the cover 20 is arranged with a locking latch 100. The locking latch 100 is a piece of metal extending vertically. A lower end of the locking latch 100 defines a locking hole 101 mated with the locking tongue 60. Furthermore, an upper surface of the mounting base 30 defines a slot 120 in which the locking latch 100 is inserted. A front end of the locking tongue 60 extends into the slot 120 to be received in the locking hole 101 in the locking latch 100. In this way, the cover 20 is locked and is prevented from being opened.

Furthermore, the movable shaft 50 or the locking tongue 60 is fixedly arranged with an extension shaft 130, extending towards the locking core 90. A movable terminal of the locking core 90 is arranged with a pendulum arm 140 that drives the extension shaft 130 to move. The pendulum arm 140 is in a "Z" shape. A horizontal sub-arm of the pendulum arm 140 is extending vertically and is fixedly connected to the movable terminal of the locking core 90. Another horizontal sub-arm is disposed on a side of the extension shaft 130 facing towards the locking tongue 60. When the pendulum arm 140 is rotated clockwisely, the pendulum arm 140 pushes the extension shaft 130 and the movable shaft 50 to move together in a direction away from the locking tongue 60, and in this way, the locking tongue 60 is moved out of the locking hole 101. Specifically, an inner wall of the mounting cavity 40 defines a movement hole 401 in which the extension shaft 130 can move.

Under normal situations, the user operates the electric password switch module 80 to control reciprocately-driving mechanism to drive the movable shaft 50 to move frontwardly or rearwardly in an axial direction, the locking tongue 60 is fastened into or taken out of the locking hole in the locking latch 100. In this way, the box body 10 is opened and closed without any key. When the electric password switch module 80 fails due to malfunctioning and the box body 10 needs to be opened, a key is inserted into the locking core 90 and is rotated, enabling the locking core 90 to drive the pendulum arm 140 to rotate and to drive the extension shaft 130 to move toward a rear side of the extension shaft 130. In this way, the movable shaft 50 and the locking tongue 60 are driven to move out of the locking latch 100, and the box body 10 can be opened by mechanical means. In this way, the gun container can be opened by two double unlocking manners, and even if an electric system malfunctions, the gun container can be opened normally and can be used conveniently.

In the present embodiment, the reciprocately-driving module 70 includes a slide sleeve 71 that coaxially and slidably sleeves the movable shaft 50, a connection rod 72 driving the slide sleeve 71 to move, a gear rod 73 driving the connection rod 72 to move along a length direction of the movable shaft 50, and a motor 74 driving the gear rod 73 to move reciprocately. The movable shaft 50 is sleeved by two springs 150 respectively disposed on two sides of the slide sleeve 71. An end of each of the two springs 150 away from the slide sleeve 71 is positioned on the movable shaft 50 by a limiting member. When the motor 74 receives an unlocking control signal from an electric password switch, the motor 74 rotates to drive the gear rod 73 to move frontwardly. In this way, the gear rod 73, the connection rod 72, the slide sleeve 71, and the two springs 150 cooperatively drive the movable shaft 50 to move frontwardly, driving the locking tongue 60 to be inserted in the locking latch 100. Therefore, a locking operation is achieved. In the above process, the two springs 150 at the two sides of the slide sleeve 71 can drive the movable shaft 50 to move and provide a cushioning effect. For the cushioning effect, the motor 74 is prevented from being burnt out due to being subjected to an excessive load when the locking tongue 60 is jammed, and gear teeth of the gear rod 73 are prevented from being broken due to the gear rod 73 being subjected to an excessively large resistance.

In the present embodiment, the movable shaft 50 is disposed between the motor 74 and the slot 120 and is extending perpendicularly to an axis of the motor 74. A first positioning seat 160 is received in the mounting cavity 40 and is disposed on a side of the motor 74 facing towards the movable shaft. The first positioning seat 160 defines a travel groove 161 in which the movable shaft 50 moves. When assembled in place, gears 741 on a rotation shaft of the motor 74 abuts the gear rod 73 against a top surface of the mounting cavity 40. An end of the movable shaft 50 away from the locking tongue 60 is arranged with an annular tab 51. The limiting member configured to limit one of the two springs sleeving the movable shaft 50 is the annular tab 51, and the limiting member configured to limit the other one of the two springs sleeving the movable shaft 50 is the locking tongue 60. When assembled in place, the annular tab 51 is received in the travel groove 161. A second positioning seat 170 is received in the mounting cavity 40 and is disposed on a side of the motor 74 away from the first positioning seat 160. The first positioning seat 160 and the second positioning seat 170 are both fixed to the top surface of the mounting cavity 40. The travel groove 161 extends through a lower end of the first positioning seat 160, and the first positioning seat 160 is connected to a lower end of the second positioning seat 170 through a fixation plate 180. A positioning cavity is formed cooperatively by the first positioning seat 160, the second positioning seat 170, and the fixation plate 180, and the motor 74 is positioned in the positioning cavity. When assembled in place, the fixation plate 180 limits the annular tab 51 within the travel groove 161. The first positioning seat 160, the second positioning seat 170, and the fixation plate 180 cooperatively position the motor 74 and the movable shaft 50. The gear rod 73 and the movable shaft 50 are fixed synchronously as the motor 74 is fixed. In this way, an assembling operation during manufacturing and processing is greatly simplified, and once the motor 74 is positioned, an overall of the reciprocately-driving module 70 is fixed.

The mounting base 30 includes a mounting body 31 having an opening at a lower end of the mounting body 31, and a sealing plate 32 sealing the opening of the mounting body 31. Defining the opening at the lower end of the mounting body 31 allows the motor 74, the gear rod 73, and the movable shaft 50 to be mounted in place and to be fixed by performing one mounting step. Therefore, assembling and processing are facilitated. Further, an abutting block 190 is disposed between the sealing plate 32 and the fixation plate 180. After being assembled, the sealing plate 32 presses the abutting block 190 against the fixation plate 180.

In the present embodiment, the extension shaft 130 is arranged on the locking tongue 60, the movement hole 401 is in an elongated shaped and extends along the length direction of the movable shaft 50. An end of the movement hole 401 away from the locking tongue 60 is communicated with a vertical hole 402 extending downwardly, and the extension shaft 130 can be inserted in the vertical hole 402. In detail, the vertical hole 402 is located in a rotational radius of an end of the pendulum arm 140. The pendulum arm 140 may drive the extension shaft 130 to move rearwardly to be received in the vertical hole 402 for positioning. In this way, the locking tongue 60 is constantly in a contracting state. When the locking tongue 60 needs to be pushed out again, the locking core 90 is rotated reversely, the pendulum arm 140 pushes the extension shaft 130 from a lower side of the extension shaft 130 upwardly to enable the extension shaft 130 to be received in the movement hole 401, and the locking tongue 60 is automatically reset by the two springs 150.

In the present embodiment, a third positioning seat 200 is received in the mounting cavity 40 and corresponds to the locking tongue 60. The third positioning seat 200 defines a through hole 201, and a front end of the locking tongue 60 can extend through the through hole 201. In a locked state, the extension shaft 130 abuts against a side wall of the third positioning seat 200 facing towards the motor 74. The slot 120 is disposed on a side of the third positioning seat 200 away from the motor 74. The third positioning seat 200 guides and limits the locking tongue 60 and positions the extension shaft 130. In addition, the third positioning seat 200 provides a more stable positioning point for the locking tongue 60 in a vertical direction, preventing the locking tongue 60 from being easily driven to move up and down by the locking latch 100, and lowering a risk of opening the cover.

In the present embodiment, a mounting plate 220 extending vertically is arranged inside the box body 10 and at a front end of the box body 10. A left end and a right end of the mounting plate 220 are both fixedly connected to the box body 10. The locking core 90 is arranged at a front side of the mounting plate 220. An upper end of the mounting plate 220 is arranged with a first extension portion 221 that extends horizontally and frontwardly. In this way, the mounting plate 220 is in an L shape. The mounting seat 30 is fixed to a lower surface of the first extension portion 221. The electric password switch module 80 is arranged at a front side of an upper surface of the first extension portion 221. A rear side of the upper surface of the first extension portion 221 is arranged with a fastening position 230 corresponding to the cover 20. The fastening position 230 defines an avoidance hole 240 corresponding to the slot 120 to allow the locking latch 100 to pass through the avoidance hole 240. The mounting plate 220 is arranged to fix the mounting seat 30 and to strengthen overall structural strength of the box body 10. In addition, the mounting plate 220 isolates a storage space inside the box body 10 from the mounting seat 30 and provides a space for mounting the electric password switch module 80.

In the present embodiment, the box body 10 includes a bottom plate 11. Each of a front end and a rear end of the bottom plate 11 is arranged with a vertical portion 110 that is extending vertically and upwardly. The box body 10 further includes two side plates 12 that cover an opening at a left of the bottom plate 11 and an opening at a right of the bottom plate 11. An upper end of the vertical portion 110 at the front end of the bottom plate 11 is arranged with a second extension portion 113 that extends rearwardly. The electric password switch module 80 is disposed between the second extension portion 113 and the first extension portion 221. The second extension portion 113 is arranged with an operation window 111 through which an operation is performed on the electric password switch module 80. Further, a rear end of the second extension portion 113 is arranged with a third extension portion 112 extending downwardly. A lower end of the third extension portion 112 is flush with the upper surface of the first extension portion 221 and separates the electric password switch module 80 from the storage cavity.

In addition, a battery 250 and a charging control board 260 are disposed between the vertical portion 110 and the mounting plate 220, the battery 250 supplies power for the electric password switch module 80, and the charging control board 260 charges the battery 250. Further, the cover 20 is rotatably arranged, via a rotation shaft, on the vertical portion 110 at the rear end of the bottom plate 11. The vertical portion 110 at the front end of the bottom plate 11 defines a mounting hole 270 corresponding to the locking core 90 and a charging port 280 corresponding to the charging control board 260. Further, the mounting plate 220 defines a detaching window 290 corresponding to the battery 250 and is arranged with a battery cover 300 sealing the detaching window.

It is understood that, any ordinary skilled person in the art may perform improvements or transformations based on the above description, and all the improvements and the transformations shall fall within the scope of the appended claims of the present disclosure.

What is claimed is:

1. A gun container having a double-coupling locking mechanism, said gun container comprising a box body and a cover covering an opening at a top of the box body; wherein a mounting base is fixedly arranged in the box body, the mounting base defines a mounting cavity; a movable shaft is received in the mounting cavity and is extended horizontally; a locking tongue is arranged at an end of the movable shaft; a reciprocately-driving module is received in the mounting cavity and is configured to drive the movable shaft to move reciprocately along an axial length direction of the movable shaft; an electric password switch module is arranged on the box body and is configured to control the reciprocately-driving module; a locking core is arranged on the box body and is perpendicular to the movable shaft and located at a front side of the movable shaft; the cover is arranged with a locking latch; the mounting base defines a slot in which the locking latch is inserted; a front end of the locking tongue extends into the slot to be mated with the locking latch to lock the cover; the movable shaft or the locking tongue is fixedly arranged with an extension shaft, extending towards the locking core; the locking core is arranged with a pendulum arm that is configured to drive the extension shaft to move; an inner wall of the mounting cavity defines a movement hole in which the extension shaft is capable of moving.

2. The gun container according to claim 1, wherein, the reciprocately-driving module comprises a slide sleeve that coaxially and slidably sleeves the movable shaft, a connection rod configured to drive the slide sleeve to move, a gear rod configured to drive the connection rod to move along a length direction of the movable shaft, and a motor configured to drive the gear rod to move reciprocately; the movable shaft is sleeved by two springs, and the two springs are respectively disposed on two sides of the slide sleeve; an end of each of the two springs away from the slide sleeve is positioned on the movable shaft by a limiting member.

3. The gun container according to claim 2, wherein, the movable shaft is disposed between the motor and the slot and is extending perpendicularly to an axis of the motor; a first positioning seat is received in the mounting cavity and is disposed on a side of the motor facing towards the movable shaft; the first positioning seat defines a travel groove in which the movable shaft is capable of moving; and when assembled in place, gears on a rotation shaft of the motor abuts the gear rod against a top surface of the mounting cavity.

4. The gun container according to claim 3, wherein an end of the movable shaft away from the locking tongue is arranged with an annular tab; the limiting member for one of the two springs is the annular tab, the limiting member for the other one of the two springs is the locking tongue; and when assembled in place, the annular tab is received in the travel groove.

5. The gun container according to claim 4, wherein, a second positioning seat is received in the mounting cavity and is disposed on a side of the motor away from the first positioning seat the travel groove extends through a lower end of the first positioning seat, and the first positioning seat is connected to a lower end of the second positioning seat through a fixation plate; a positioning cavity is formed cooperatively by the first positioning seat, the second positioning seat, and the fixation plate; and the motor is positioned in the positioning cavity; and when assembled in place, the fixation plate limits the annular tab in the travel groove.

6. The gun container according to claim 1, wherein, the extension shaft is arranged on the locking tongue, the movement hole is in an elongated shaped and extends along a length direction of the movable shaft; an end of the movement hole away from the locking tongue is communicated with a vertical hole extending downwardly, and the extension shaft is configured be inserted in the vertical hole.

7. The gun container according to claim 6, wherein, a third positioning seat is received in the mounting cavity and corresponds to the locking tongue; the third positioning seat defines a through hole, and a front end of the locking tongue is configured to extend through the through hole; in a locked state, the extension shaft abuts against a side wall of the third positioning seat facing towards the motor; the slot is disposed on a side of the third positioning seat away from the motor.

8. The gun container according to claim 1, wherein, a mounting plate extending vertically is arranged inside the box body and at a front end of the box body; a left end and a right end of the mounting plate are both fixedly connected to the box body; the locking core is disposed at a front side of the mounting plate; an upper end of the mounting plate is arranged with a first extension portion that extends frontwardly; the mounting seat is fixed to a lower surface of the first extension portion; the electric password switch module is arranged at a front side of an upper surface of the first extension portion; a rear side of the upper surface of the first extension portion is arranged with a fastening position corresponding to the cover; the fastening position defines an avoidance hole corresponding to the slot, the locking latch extends through the avoidance hole.

9. The gun container according to claim 8, wherein, the box body comprises a bottom plate; each of a front end and a rear end of the bottom plate is arranged with a vertical portion that is extending vertically and upwardly; the box body further comprises two side plates respectively covering an opening at a left of the bottom plate and an opening at a right of the bottom plate; an upper end of the vertical portion at the front end of the bottom plate is arranged with a second extension portion extending rearwardly; the electric password switch module is disposed between the second extension portion and the first extension portion; the second extension portion is arranged with an operation window through which an operation is capable of being performed on the electric password switch module.

10. The gun container according to claim 9, wherein, the cover is rotatably arranged, via a rotation shaft, on the vertical portion at the rear end of the bottom plate; the vertical portion at the front end of the bottom plate defines a mounting hole corresponding to the locking core.

* * * * *